Feb. 4, 1969
J. S. BAER
3,425,526
COIL CLUTCH WITH COIL PILOT BRAKE
Filed Aug. 10, 1966
Sheet 1 of 2
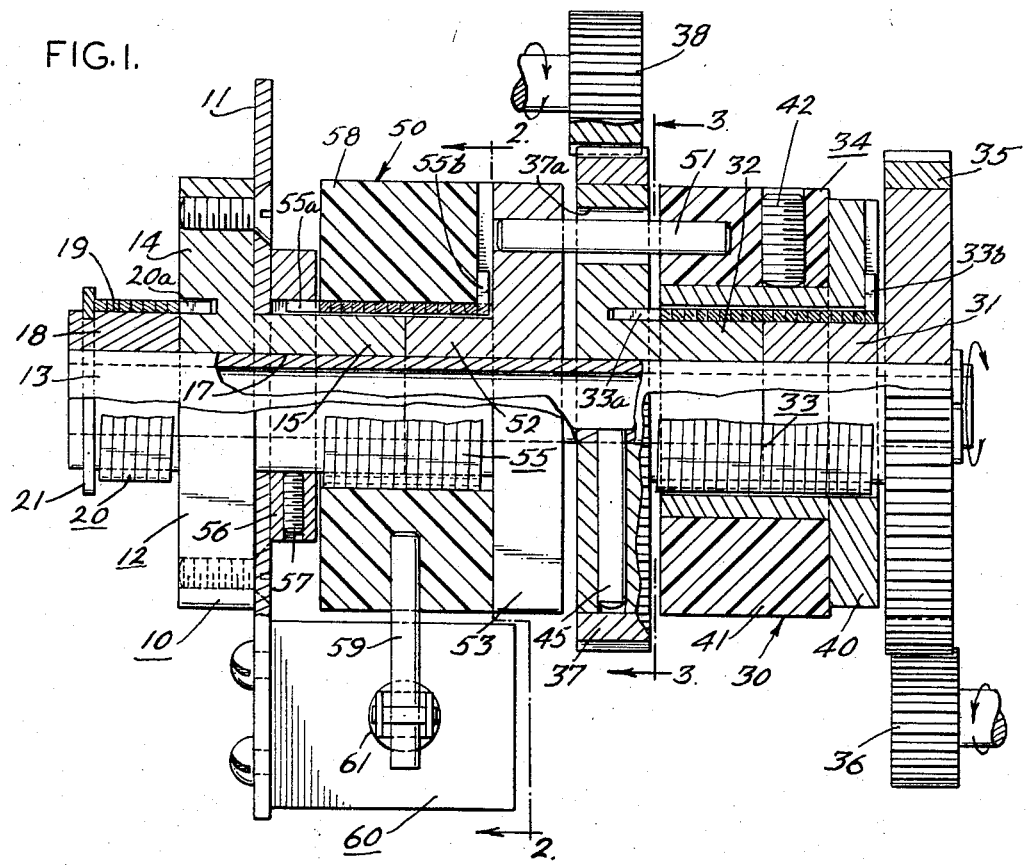
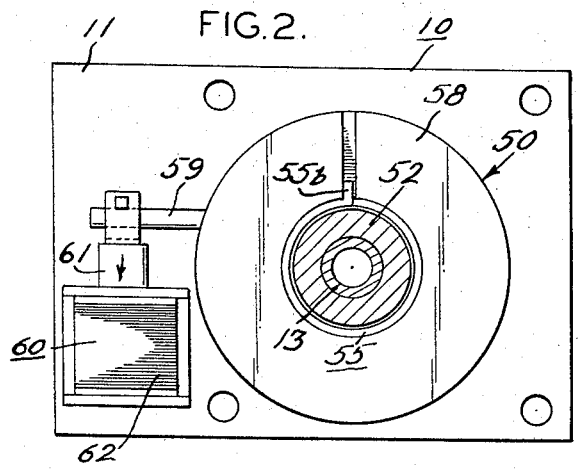
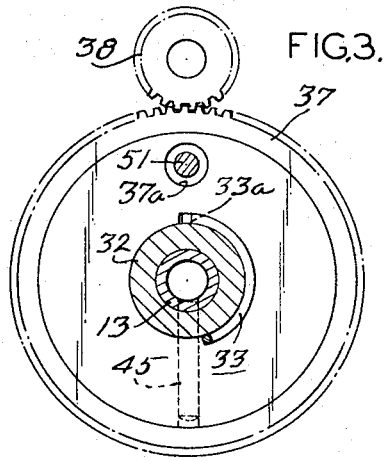
INVENTOR:
JOHN S. BAER
BY
Howson & Howson
ATTYS.

Feb. 4, 1969 J. S. BAER 3,425,526
COIL CLUTCH WITH COIL PILOT BRAKE
Filed Aug. 10, 1966 Sheet 2 of 2
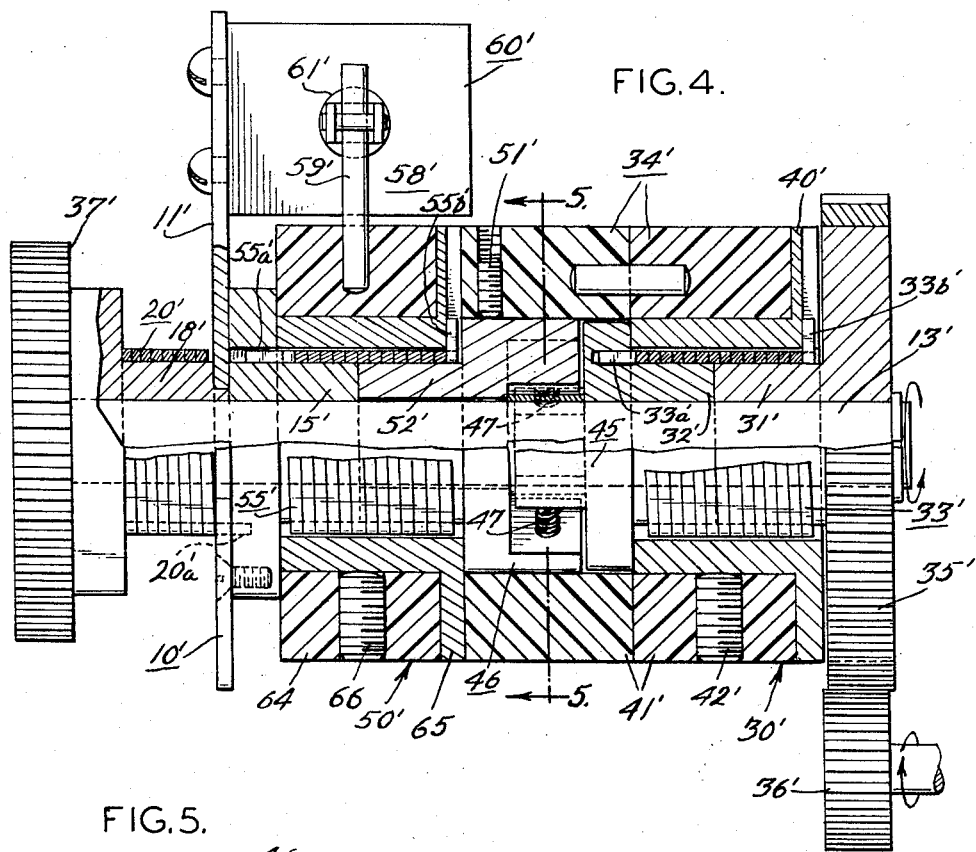
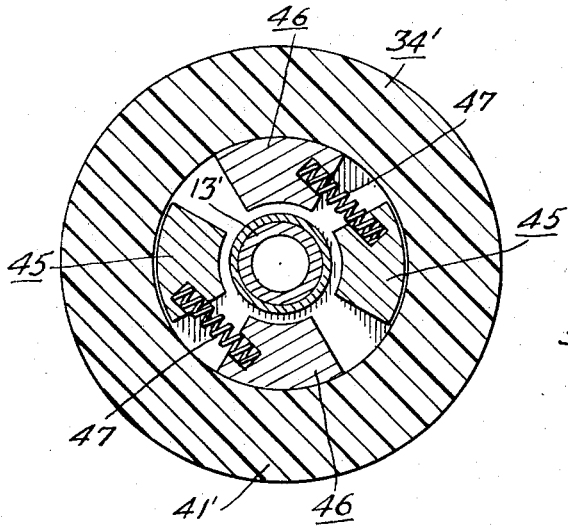
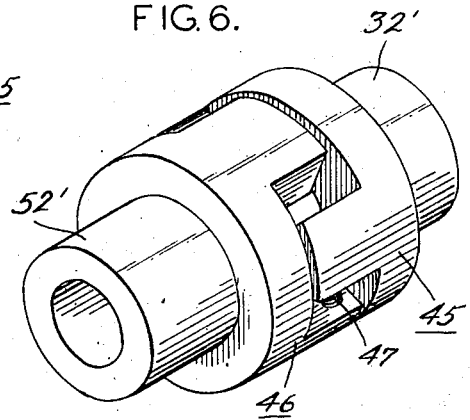
INVENTOR:
JOHN S. BAER
BY Howson & Howson
ATTYS.

United States Patent Office 3,425,526
Patented Feb. 4, 1969

3,425,526
COIL CLUTCH WITH COIL PILOT BRAKE
John S. Baer, Medford Lakes, N.J., assignor to Precision Specialties, Inc., Pitman, N.J., a corporation of Missouri
Filed Aug. 10, 1966, Ser. No. 576,495
U.S. Cl. 192—12                                    15 Claims
Int. Cl. F16d 67/02, 23/00; B601 7/00

ABSTRACT OF THE DISCLOSURE

A clutch brake is provided for a spring clutch having coaxial and adjacent input and output hubs rotatably mounted on a frame and having a helical drive spring wound on and engaging the clutch surfaces of the hubs in such a way as to tend to wrap tighter as a result of the driving the output hub. One end of the spring is affixed to the output hub and the other end of the spring is affixed to a clutch control member which, when stopped, acts to unwrap the drive spring from the input hub and thereby disengage the clutch. The clutch control member has structure positively engaging the output hub following a limited predetermined amount of relative rotational movement of the output hub relative to the clutch control member. The clutch control member is stopped by brake means which includes a brake hub fixed to and rotatable with the clutch control member and a frame hub fixed to a stationary reference frame. A helical brake spring, similar to the clutch spring, is fixed between a brake control collar and the frame, and the spring is normally held out of contact with the brake hub. The spring is moved, or allowed to move, into contact with both hubs when the control collar is rotated relative to the frame and provides a brake. Backup prevention means is preferably provided between the frame and the output hub permitting normal drive rotation of the output hub but preventing essentially all reverse rotation of the output hub.

---

The present invention relates to a clutch-brake and more specifically to a device which employs a clutch of the helical or wrapped spring type which is normally engaged and driving and an associated brake which upon braking acts to disengage the clutch. The effect is to disengage the output system driven through the clutch and stop the output system at a predetermined point within relatively small error tolerances.

The prior art has provided various types of clutches capable of use in the combination of the present invention including clutches capable of transmitting substantial loads. Whenever braking has been necessary, however, even if synchronized with disengagement and engagement of the clutch, prior art system have supplied braking by some outside apparatus not associated with the clutch. Normally, however, disengagement of the clutch has simply separated the drive from the output system and, depending upon the inertia of the output system and other factors involved, the driven side of the clutch and its associated apparatus would continue to move. The system driven by the output side of the clutch has been stopped by friction or drag or some superimposed braking effect in the driven system.

As various types of machinery employing clutches have become more sophisticated, the need for precision stopping of the output system associated with the clutch has become apparent in many applications. For example, in various types of feed mechanisms which must be synchronized with other processes, it is important not merely to stop the feed but to stop the feed at a very specific place in order to obtain proper registration. In my prior U.S. Patent 3,349,880, and particularly the structure shown in FIGS. 5–9 thereof, there is disclosed a clutch device which is capable of such application. The present invention is also capable of such an application and is an improvement of that device. Specifically, the present invention is capable of stopping the output system connected to the clutch output more precisely at a predetermined position when the clutch is disengaged. Like the device of said patent, the clutch and the brake are associated so that the brake is first applied and thereby the clutch is disengaged. The amount of over-travel of the output side of the clutch once the brake is applied may be precisely set and kept very small.

The structure of the present invention insures that braking will be immediate and therefore the point of stopping will be precise.

More specifically, the present invention relates to a brake-clutch combination including a helical spring normally wrapped down and normally driving the clutch and a suitable disengaged brake element. The clutch consists of an input hub, an output hub, a clutch drive spring and a clutch control member. The input and output hubs are mounted so that each is rotatable relative to the frame about a common axis and each, at least the input, and preferably both input and output hubs, provide a coaxial cylindrical clutch surface. The helical drive spring is wound on the axially aligned and preferably immediately adjacent clutch surfaces of the hubs so as to tend to wrap tighter around them and insure the positive driving effect as the input hub is driven. One end of the helical spring is affixed to the output hub and the other end is affixed to the control element. The clutch control member normally rotates with the hubs but when slowed or stopped relative to the rotation of the hubs causes the spring to unwrap from the hubs and therefore disengage the output and the input hubs. The stopping of the control element is accomplished by the brake means. The brake means includes at least a rotatable brake hub affixed to the clutch control member and rotatable relative to the frame with the control element. Encircling the brake hub is a helical brake spring connected between the frame at one end and a brake control member at the other end. The brake control member is rotatable relative to the frame and preferably controlled by an actuator to rotate the brake control member to wrap the brake spring down on the brake hub to immediately stop the brake hub relative to the frame.

For a better understanding of the present invention, reference is made to the following drawings in which
 FIG. 1 is a cross-sectional view of a clutch brake of the present invention;
 FIG. 2 is a sectional view on a smaller scale taken on line 2—2 of FIG. 1;
 FIG. 3 is a sectional view on a smaller scale taken on line 3—3 of FIG. 1;
 FIG. 4 is a cross-sectional view of a modified form of the clutch brake of the present invention;
 FIG. 5 is a sectional view taken on line 5—5 of FIG. 4; and FIG. 6 is a perspective view of the coupling section between the clutch and brake sections of the clutch-brake of FIG. 4.

Referring particularly to FIG. 1, the structure shown in section comprises, broadly speaking, portions generally designated as the frame 10, the clutch 30, and the brake 50.

The frame 10 consists of a mounting plate 11, a frame hub 12 and a bearing shaft 13. The frame hub consists of integral radially extensive flange portion 14 and a tubular portion 15. Flange portion 14 is affixed to the mounting plate by suitable means and tubular portion 15 extends through a clearance hole in the mounting plate. The function of the frame will be better understood by reference to my Patent No. 3,373,851, which applies to the structure of the present invention.

The outer surface of tubular portion 15 provides a cylindrical clutch surface. The coaxial inner surface 17 of the tubular portion 15 provides a bearing support for shaft 13. The shaft 13 is spline connected to a collar 18 whose outer cylindrical surface provides a clutch surface 19. About this cylindrical clutch surface 19 is wrapped a helical clutch spring 20 which is connected at only one end of the frame hub 12. The action and purpose of the spring 20 will be further explained hereafter.

The brake section 50 and the clutch section 30 are arranged coaxially and in aligned fashion on the shaft 13. For greater convenience in understanding the overall structure the clutch structure will be described first.

The clutch structure employs an input hub 31, an output hub 32, a drive spring 33 and a control collar, generally designated 34. In various embodiments, these members may take various forms. However, in the embodiment illustrated in FIGS. 1–3, the input hub is integral with a spur gear element 35 which meshes with input gear 36. The input hub 31 and spur gear 35 are rotatably supported by shaft 13 to rotate about their common axis. The outer cylindrical coaxial surface of input hub 31 provides a clutch surface. Output hub 32 is also integral with a spur gear member 37 from which the output may be taken by output gear 38. It will be understood that the input and output systems may be of various types and that the clutch-brake will have to be designed to cooperate with the system with which it is to be used, or vice versa. The input and output gears 36 and 38 are therefore represented schematically in the drawings. Gear 37 and output hub 32 are coaxially supported on shaft 13 to which they are fixed by pin 45 so that shaft 13 rotates with the output hub 32. The outer surface of hub 32, which is preferably of the same diameter and abutting the clutch surface of input hub 31, provides the output clutch surface. The helical, rectangular-sectioned drive spring 33 is affixed to the output hub by bending tang 33a in an axial direction and inserting it in a hole in output hub 32 provided to retain the end of spring 33 fixed relative to the output hub. The opposite end tang 33b of drive spring 33 is bent radially outward and extends into a radial slot in the end of control collar 34 so that one end of the spring is fixed to the control collar.

Under normal circumstances, the drive spring 33 is wrapped tightly around the clutch surfaces of both the input and output hubs 31 and 32 in such direction that as the drive hub 31 is rotated it tends to wind the clutch spring tighter thereby affording a positive drive normally between the input and the output hubs. In order to declutch, the control collar 34 is stopped thereby loosening the spring 33 from the input hub as it continues to rotate. Without the drive spring engaging the hubs there is no means of transferring the torque from the input to the output hub and the input hub 31 is free to rotate within the spring. With no means of transferring torque the output hub will not be driven, but may tend to continue to rotate due to the inertia of the load.

The control collar 34 is preferably composed of two pieces, the spring engaging element 40 and the stop element 41 which are rotatably adjustable relative to one another about the common axis of rotation and which may assume a variety of forms. The spring engaging element 40, which may assume numerous other forms, in the present case is generally tubular with a radially extending flange at one end which flange contains the radial slot for retaining the tang 33b of spring 33. Stop element 41 is a solid annular member snugly accommodating the tubular portion of the spring engaging element 40 which abuts against the radial flange of spring engaging element 40. Set-screw 42 extends through stop element 41 into engagement with spring engaging element 40 in order to connect the two members of the control collar 34 so that they act as one. In rotatably adjusting the stop element relative to the spring engaging element, the set-screw 42 is loosened and when the adjustment is accomplished the screw 42 is tightened to prevent further relative movement.

In this particular embodiment, the stop element 41 is made integral with over-travel pin 51, an element of the brake unit, which is embedded in the stop element 41 and, therefore, moves with it at all times. Over-travel pin 51 passes through a hole 37a in gear 37 of the output hub. Since the control collar 34 and the output hub 32 normally move in unison, hole 37a provides sufficient clearance to permit sufficient relative movement of pin 51, and therefore the control collar 34, to permit de-clutching but prevents excessive relative movement between the output hub 32 and collar 34. The pin 51, in turn, is engaged and permanently fixed to rotatable hub 52 of the brake structure through its radially extending flange 53. The rotatable hub 52 is rotatably supported on shaft 13 and therefore normally rotates with output hub 32 as it rotates. The output cylindrical surface of hub 52 provides a clutching surface. Hub 52 is normally de-clutched and free to rotate with the control collar 34 with which it is rigidly connected by over-travel pin 51. Hub 15 has a diameter similar to hub 52, it abuts hub 52 and, like hub 52, is surrounded by helical brake spring 55. Spring 55 has an axially aligned end tang 55a secured in an axial hole in an adjustable ring 56 whose angular position relative to frame hub 12 and shaft 13 can be adjusted by loosening radial set-screw 57 which holds it in place against hub 12 and rotating the ring 56. When the ring 56 is in its desired position, screw 57 is retightened. The other end of the spring 55 is provided with radially extending end tang 55b which is engaged in a radially extending slot in one end of the collar 58. Collar 58 may be actuated by any one of a variety of conventional means. Here collar 58 is fixed to an outwardly extending control pin 59 which is connected, in turn, to the solenoid 60 (see FIG. 2). More specifically control pin 59 is connected to the plunger 61 which moves relative to the winding 62 of the solenoid fixed to the frame, and specifically to the mounting plate 11.

Brake spring 55 tends to wrap down on hubs 15 and 52 but, normally is disengaged from the rotatable hub 52 in the sense that when the clutch is engaged, the brake spring 55 must be held disengaged as shown in the drawings. The solenoid is, therefore, normally energized so that the collar 58 is in position to hold the brake spring 55 unwrapped or out of engagement with the surfaces of fixed hub 15 and rotatable hub 52, and thereby allow the rotatable hub to rotate relative to the frame. In order to apply the brake, the solenoid 60 is de-energized, allowing the spring 55 to wrap down on hubs 15 and 52, thereby stopping rotatable hub 52 relative to the frame. This braking action will stop the over-travel pin 51 and the control collar 34. Stopping the control collar causes clutch spring 33 to unwind, thereby de-clutching the input hub from the output hub, as previously described. Also as previously described relative movement between the output hub and the collar is limited to the clearance provided between the sides of hole 37a and the pin 51. The pin and the rotatable hub are held fast by the brake spring 55 relative to the frame hub 12 while the input continues to rotate, so that within the limits provided by this clearance the output hub is stopped and held and the output system is stopped within the same narrow limits. The structure, of course, must be designed depending upon the load on the output hub side of the clutch system in order to avoid shearing pin 51.

The above described structure, and other embodiments which have the brake normally engaged and released by energizing a solenoid or other actuator, have the advantage of being fail safe. In other words, loss of power will cause the clutch to disengage and the brake to engage.

It is possible to reverse the action of the brake by having spring 55 disengaged from the frame hub 15 and the rotatable hub 52 under normal circumstances. With such an arrangement actuation of the solenoid is designed to move the brake collar 58 sufficiently to engage the brake spring 55 so that the rotatable hub becomes fixed to the frame. Under these conditions when the solenoid is energized the brake is applied which is opposite from the action of the previously described embodiment.

To prevent the load from reversing direction when power is removed after the brake is applied, helical anti-backup spring 20 acts between the frame and the output hub. Spring 20 has one end fixed to the mounting plate 11 by tang 20a which extends axially into a hole in flange 14 and is wrapped around the collar 18 which in turn is press-fitted to shaft 13. In other embodiments the spring might be attached to frame hub 12 in some other fashion and this might include frictional engagement with a hub extension abutting coaxial with and of the same diameter as collar 18. The opposite end of spring 20 is loose but retained axially in position by snap ring 21. The spring 20 is wound in such direction that it tends to be loosened by normal rotation of the shaft 13 (fixed to the output hub 32) relative to the frame but tightens down on collar 18 immediately if rotation of the shaft is reversed. Were it not for the action of spring 20, the clutch spring 33 might urge output hub 32 back into its normally engaged condition. The action of the anti-backup spring 20 through shaft 13 is such that when the brake is applied, spring 20 tightens and prevents relative rotation between the shaft 13 and the frame 10, which, in turn, holds output hub 32 in position so that spring 33 remains disengaged. When the brake is released, it is the control collar 34 which moves to permit the clutch spring 33 to re-engage input hub 31. Finally when the brake is released anti-backup spring 20 will permit rotation in the usual driven direction.

The adjustment features of the present invention are of considerable advantage. The relative adjustment of the spring engaging element 40 relative to the stop element 41 permits positioning and infinite adjustment between the output hub 32 and the collar 34 and more specifically such adjustment in the relative positioning of pin 51 within hole 37a. Such adjustment effectively permits a fine adjustment so that the minimum amount of loosening required to de-clutch the spring will be effective and yet a sufficient amount of wrapdown to insure positive action on the input hub will be assured. While the use of the set-screw 42 to permit these adjustments is a simple, yet effective means of adjustment, other means may be employed to the same end and are intended to be within the scope of the present invention.

In similar fashion, rotation of the adjustment collar 56 relative to frame hub 12 permits tightening and taking up the slack from the brake spring 55 and at the same time permits a change in the position of the adjustment collar to adjust the braking spring to its cooperation with the solenoid or to readjust the braking spring to accommodate a new substitute solenoid, with a difference in stroke or the way the stroke is applied. It also permits adjustment as the hubs and spring wear and change diameter. In all constructions the collar 56 affords a means of adjusting the brake spring to make it more promptly effective in application of force to the collar 58 to apply the brake.

Assembly of the clutch-brake is begun by first attaching collar 18 in a fixed position on shaft 13. Assembly of the clutch-brake may proceed right to left by successively sliding the members over shaft 13. Spring 20 is positioned around and attached to collar 18 and its axial tank inserted into an axial hole on flange 14 of the frame hub as it is moved into position with the mounting plate attached. The adjusting collar 56 is then installed over the tubular portion 15 of frame hub 12. The brake spring 55 assembled with its tanks 55a and 55b, in place in the adjusting collar 56 and brake collar 58 respectively, is expanded by rotating the collars relative to one another so that hub 52 may be inserted, and the whole assembly installed over the tubular portion 15 of frame hub 12. The pin 59 is in place in collar 58 and easily attached to the solenoid plunger when the solenoid is mounted on mounting plate 11. The over-travel pin 51 is in position on the collar 34.

The clutch assembly may be assembled as a unit with tang 33b in its slot by passing the spring 33 over output hub 32. The assembly is rotationally adjusted so that pin 51 may be inserted through hole 37a, and tank 33a may be inserted into its hole in output hub gear 37. Relative rotation of collar 34 and output hub 32 next permits inserting input hub 31. The whole assembly may then be slid over the shaft and the pin 51 inserted in the hole provided in flange 53. Output hub gear member 37 is pinned to the shaft 13 and a snap ring put in place to hold the clutch assembly together on the shaft 13.

After the device is assembled, the alignment of the pin 51 in hole 37a and aligning of collar 58 relative to frame hub 12 (tubular portion 15) are as above described.

Referring now to FIGS. 4 and 5, a modified version of the clutch-brake is shown. The parts differ somewhat in arrangement but functionally are much the same. Corresponding parts which have the same or similar function bear the same number designations as in FIGS. 1–3 but with the addition of primes thereto. Thus in the clutch portion the input hub is designated 31', the output hub is designated 32' and the control collar is designated 34'. In this case however, the output hub 32' is press-fitted to the shaft 13' on the remote end of which, separated from hub 32' by the brake members, is fixed output gear 37' which is also press-fitted to the shaft to rotate at all times in synchronism with the output hub 32'. The control collar 34' is elongated for functional reasons but still has been made of two elements 40' and 41' which facilitate the same adjustments as correspondingly numbered members in FIGS. 1–3. Stop element 41' is composed of two pieces 41a' and 41b' fixed together by a pin or other suitable means. Again, control collar 34' is connected to the rotating hub 52' of the brake but in this case, a cylindrical extension of the hub fits snugly within an extension of the collar and is rigidly connected thereto by means of set-screw 51'. Consequently as in the case of the FIGS. 1–3 construction, collar 34' is connected to hub 52' to be moved mechanically together, but the connection is a radial set-screw as opposed to the axial pin arrangement, and the radial set-screw has no effect in limiting relative movement between the control collar 34' and the hub 52'. Instead as seen in FIG. 6, limited relative movement is permitted by the inter-engaged coupling elements 45 and 46, 45 being connected to clutch output 32' and 46 being connected to rotatable brake hub 52'. The nature of the construction can best be seen in FIG. 6 by comparison of FIGS. 4 and 5 wherein it can be seen that the coupling members consist of interspersed segmental elements, alternate segments being attached to output hub 32' and intermediate segments being attached to rotatable brake hub 52'. As best seen in FIG. 5 these segments together roughly define a tubular form with spacings between segments such that limited angular movement is permitted. These spacings must be sufficiently large to facilitate the release of clutch spring by the relative rotational movement of hub 32' and collar 34' (attached to hub 52'). This spacing may be adjusted by movement of the elements 40' and 41' rotationally relative to one another. Springs 47 or other resilient compression members, are interposed in those spaces where element 45 is moved toward element 46 to effect declutching in order to normally urge the elements apart and to absorb rotational load inertia on braking. By varying the resilient elements between segments 45 and 46 the inertial braking can be effectively controlled. The springs also serve to assure reengagement of the clutch by urging the segments 45 and 46 apart to move the collar 34' relative to output hub 32'. These spacings between the segments 45 and 46 correspond to the clearances provided by hole 37a around pin 51 in the structure of FIGS. 1–3 and serve the same function.

The brake elements correspond to those of FIGS. 1–3, except for the absence of a member corresponding exactly to collar 56. The same adjustment function is accomplished by relatively rotatable elements 64 and 65 of brake collar 58', corresponding to elements 41' and 40' in the clutch portion. Elements 64 and 65 are normally held rigidly together by setscrew 66 but may be released for adjustment by loosening the setscrew 66.

Anti-backup spring 20' is fixed by end tang 20a to frame mounting plate 11' and operates on a hub 18', which is fixed to the shaft. The spring 20' is wound so as to tend to loosen under rotation in the normal direction of operation but frictionally engages output hub 18' to prevent backup rotation in the opposite direction when the brake is applied and the clutch operates. Since backup is prevented, the output system cannot participate in producing reengagement of the clutch and the springs 47 may therefore be necessary or desirable to cause quick and positive reengagement of the clutch.

The structures described are embodiments of a brake-clutch device which is compact and highly effective and which limits to a small angle the amount of over-travel upon the application of the brake. It is also a device capable of effectively stopping a high inertia load.

It will be obvious from the above, that the clutch-brake is capable of use with high inertia loads. Embodiments of the clutch-brake have been used to control and stop such loads at the same point within increments of a single revolution. This produces the stopping of the output hub of the clutch within a very narrow range of any selected point without reference to some other indexing means. Relationship to other indexing means is possible by synchronizing means to cause the brake to act at a precise position or time.

Many modifications of the specific device shown will occur to those skilled in the art. All such modifications are intended to be within the scope and spirit of the present invention.

I claim:
1. A clutch brake combination comprising
a frame,
an input hub rotatably supported relative to the frame, connectable to suitable drive means and provided with a coaxial cylindrical clutch surface,
an axially aligned output hub rotatably supported relative to the frame, connectable to driven apparatus and adjacent to the input hub,
a helical drive spring wound on and engaging the clutch surface of the input hub so as to tend to wrap tighter as the result of driving the output hub, one end of said spring being affixed to the output hub,
a clutch control member affixed to the other end of the drive spring and acting when stopped to unwrap the drive spring and de-clutch the output from the input hub,
a rotatable brake hub affixed to and rotatable with the clutch control member including a cylindrical surface coaxial with the axis of rotation of the input and output hubs,
a helical brake spring member capable of engaging the cylindrical surface of the rotatable brake hub, and
a brake control member movable relative to the frame for actuating said brake spring into and out of engagement with the brake hub, such that when the brake spring is in engagement with the brake hub, the brake hub affixed to the clutch control member is unable to rotate.

2. The clutch-brake of claim 1 in which backup prevention means is provided between the frame and the output hub permitting normal driven rotation of the output hub but preventing reverse rotation thereof.

3. The clutch brake of claim 2 in which means is provided to positively engage in the output hub following a limited predetermined amount of rotational movement of the output hub relatively to the stopped clutch control member in order to positively limit the amount of unwrapping of said drive spring.

4. The clutch brake of claim 3 in which the output hub is provided with a cylindrical clutch coaxial with and of essentially the same diameter as that of the adjacent input hub clutch surface, said output hub clutch surface being arranged to be engaged by the clutch spring when said spring engages the input hub clutch surface.

5. The clutch brake of claim 4 in which the frame is also provided with a cylindrical frame hub having a cylindrical surface coaxial with and of essentially the same diameter as that of the adjacent rotatable brake hub surface, said frame hub surface being arranged to be engaged by the brake spring when said brake spring engages the rotatable brake hub.

6. The clutch brake of claim 5 in which the clutch and brake elements are coaxial and share a common shaft about whose axes rotatable parts rotate.

7. The clutch brake of claim 4 in which the clutch control member is a collar coaxially surrounding at least one of the hubs with which it is associated.

8. The clutch brake of claim 5 in which the brake control member is a collar coaxially surrounding at least one of the hubs with which it is associated.

9. The clutch-brake of claim 4 in which the brake spring is affixed between the frame hub and the brake control member for actuating said brake spring and the brake spring is normally out of engagement with the rotatable hub and actuated into engagement by rotation of said brake control member.

10. The clutch-brake of claim 4 in which the brake spring is affixed between the frame hub and the brake control member for actuating said brake spring and the brake spring is normally in engagement with the rotatable hub and actuated out of engagement by rotation of said brake control member.

11. The clutch-brake of claim 4 in which the frame includes a shaft providing a common axis of rotation for all of the hubs of the clutch and the brake members.

12. The clutch-brake of claim 11 in which the output hub is connected to the shaft and the backup prevention means is a helical spring wrapped around a cylindrical surface integral with the shaft in such direction as to permit normal rotation but oppose backup when the brake is applied.

13. The clutch-brake of claim 11 in which the output hub is connected to the shaft so that the shaft turns with the output hub and other hubs are subject to rotation relative to said shaft.

14. The clutch-brake of claim 11 in which the clutch control member is connected to the rotatable hub by means engageable with a portion of the output hub within a limited predetermined range of relative movement between the clutch control member and the output hub.

15. The clutch-brake of claim 11 in which the clutch control member and rotatable hub have means interengageable with means on the output hub to limit relative movement therebetween to a predetermined range of relative movement.

References Cited

UNITED STATES PATENTS

| | | |
|---|---|---|
| 2,298,970 | 10/1942 | A. G. Russell et al. ____ 192—26 |
| 3,004,646 | 10/1961 | Seiden _____ 192—12 XR |
| 3,181,669 | 5/1965 | Kunde et al. _____ 192—81 |
| 3,232,399 | 2/1966 | Harned et al. _____ 192—26 XR |

BENJAMIN W. WYCHE III, *Primary Examiner.*

U.S. Cl. X.R.

188—161; 192—36, 81